United States Patent [19]

Kasahara et al.

[11] Patent Number: 4,948,230
[45] Date of Patent: Aug. 14, 1990

[54] OBJECTIVE LENS DRIVING APPARATUS

[75] Inventors: Akihiro Kasahara, Charlottesville, Va.; Akira Yamada, Yokohama, Japan; Katsutoshi Wada, Kawasaki, Japan; Hideo Yamasaki, Yokohama, Japan

[73] Assignee: Kabushiki Kaisha Toshiba, Kawasaki, Japan

[21] Appl. No.: 320,800

[22] Filed: Mar. 9, 1989

Related U.S. Application Data

[63] Continuation of Ser. No. 137,825, Dec. 24, 1987, abandoned.

[30] Foreign Application Priority Data

Dec. 26, 1986 [JP] Japan .............................. 61-315374
Dec. 30, 1987 [JP] Japan .............................. 62-299756

[51] Int. Cl.$^5$ .............................................. G02B 7/02
[52] U.S. Cl. .................................. 350/255; 350/247; 369/45; 369/44.11
[58] Field of Search ................ 350/255, 247; 369/44, 369/45, 46

[56] References Cited

U.S. PATENT DOCUMENTS

| 4,592,037 | 5/1986 | Ohnuki | 350/255 |
| 4,750,164 | 6/1988 | Nose | 350/255 |
| 4,767,187 | 8/1988 | Gijzen et al. | 350/247 |
| 4,782,475 | 11/1988 | Chandler | 369/45 |

FOREIGN PATENT DOCUMENTS 59-221839 12/1984 Japan .
60-197942 10/1985 Japan .

Primary Examiner—Bruce Y. Arnold
Assistant Examiner—Loha Ben
Attorney, Agent, or Firm—Oblon, Spivak, McClelland, Maier & Neustadt

[57] ABSTRACT

An objective lens driving apparatus is provided which can restrain hysteresis phenomena in the relationship between semi-static displacements and forces in a focusing direction of the objective lens. The apparatus can also maintain the balance of force even when the objective lens is shifted in a focusing or tracking direction. Thus, the objective lens can be readily prevented from tilting. The apparatus also has a simplified configuration that can readily start up control operations in servomechanism. Thus, stable control characteristics of the apparatus can be achieved.

15 Claims, 12 Drawing Sheets

OBJECTIVE LENS DRIVING APPARATUS

This application is a continuation of application Ser. No. 137,825, filed on Dec. 24, 1987, now abandoned.

BACKGROUND OF THE INVENTION

1. Field of the Invention

This invention relates to an objective lens driving apparatus, and more particularly to an objective lens driving apparatus for an optical reproduction system.

2. Description of the Prior Art

In an optical reproduction system using laser light, signals of information are detected through an objective lens that focuses beams of the laser light. However, in order to accurately detect such signals, a focusing control and a tracking control are necessary. The focusing control automatically focuses the light beam on an information recording medium despite unevenness and vibrations of the medium. The tracking control causes the optical spot of the focused light beam to automatically track a signal track on the medium. To perform the focusing and tracking controls, an error detecting apparatus, which detects errors caused by unevenness and vibration of the medium, is necessary. Also, an objective lens driving apparatus, which drives the objective lens so as to cancel such errors, is needed.

Conventional objective lens driving apparatus may be classified into two types in terms of operating principles. In one type, as shown in FIGS. 13 through 15, a movable unit supporting an objective lens rotates about an inertial main axis, and moves in a direction parallel to the inertial main axis. Thus, movements in two orthogonal directions, such as the tracking and focusing directions of the objective lens, can be achieved. In the other type, as shown in FIGS. 16 and 17, a movable unit supporting an objective lens moves directly in two orthogonal directions, such as the tracking and focusing directions of the objective lens.

The specific configurations and operating principles of the above-described types of objective lens driving apparatus will be described. FIG. 13 is a perspective view, FIG. 14 a sectional view taken along line A—A of FIG. 13, and FIG. 15 a sectional view taken along line B—B of FIG. 13 of the first type of prior art driving apparatus. FIG. 16 a perspective view, and FIG. 17 an exploded perspective view of the second type of prior art driving apparatus.

The objective lens driving apparatus shown in FIGS. 13 through 15 is configured as follows. In FIG. 13, a shaft 102 is implanted perpendicularly at the center of upper face of a base 101 made of a magnetic material. The shaft 102 is fitted into a sleeve bearing 103, which serves as a sliding bearing. A supporting sleeve 104 having a bottom wall 104a is rigidly secured to the sleeve bearing 103. Thus, the supporting sleeve 104 can slide in the axial direction of the shaft 102, and also can rotate about the shaft 102. An objective lens 105 is supported by the bottom wall 104a of the supporting sleeve 104. A sleeve portion 104b of the supporting sleeve 104 serves as a coil bobbin. A focusing coil 106 is used for controlling positions of the supporting sleeve 104 in the axial direction of the shaft 102. A tracking coil 107 is used for controlling the position of the supporting sleeve 104 in the circumferential direction of the shaft 102. The focusing and tracking coils 106 and 107 are rigidly secured to an outer surface of the sleeve portion 104b.

Inner yokes 108a and 108b project from the base 101 in symmetry with respect to the shaft 102. The yokes 108a and 108b are respectively opposed to an inner wall 104c of the sleeve portion 104b and also to an inner face 104d of the bottom wall 104a in a non-contact relation with each other. A permanent magnet 110 is disposed between outer yokes 109a and 109b and the base 101, yokes 109a and 109b are magnetized to form a magnetic field in the axial direction of the shaft 102. The outer yokes 109a and 109b are disposed outside the sleeve portion 104b. The outer yokes 109a and 109b are respectively opposed to the outer faces 108c and 108d of the inner yokes 108a and 108b in a non-contact relation with each other. A support 111 is disposed on the base 101 at a position inside the sleeve portion 104b of the supporting sleeve 104. A damper member 112 for setting a neutral position is provided between the support 111 and the sleeve bearing 103. The damper member 112 is made of a resilient material, such as rubber. In FIG. 14, a light-penetrating aperture 113 is provided at a position on the base 101, and directs beams of light to and from the objective lens 105.

In the above-described configuration, when the focusing coil 106 is energized, the position of the supporting sleeve 104 is changed by an electromagnetic force in the Y-axis direction, as shown in FIG. 13. Thus, when the exciting current is appropriately controlled, the focusing control can be performed. Further, when the tracking coils 107 are energized, the supporting sleeve 104 is slightly rotated by an electromagnetic force in the X direction, as shown in FIG. 13. Thus, when the exciting currents are appropriately controlled, the tracking control can be performed. The control of exciting currents is performed by means of a conventional servo control system (not shown).

FIGS. 16 and 17 show another example of a conventional objective lens driving apparatus. In FIG. 16, a metal rod-fixing plate 212 is attached to extend perpendicular to one end of a base 211 made of a magnetic material. One end of each of four metal rods 213, which are parallel to each other and also parallel to the base 211, is rigidly secured to metal-rod fixing plate 212. A movable unit 215 supporting an objective lens 214 is rigidly secured on the other ends of metal rods 213. A focusing coil 216 and tracking coils 217 are rigidly fixed to the movable unit 215. A pair of inner yokes 218 project from the base 211 so as to fit with a predetermined clearance, into openings 216a in the focusing coil 216. Further, a pair of outer yokes 219 project from the base 211 so as to sandwich the focusing coil 216 and the tracking coils 217 on opposite sides of the inner yokes 218. Two permanent magnets 220 are respectively fixed to the inner faces 219a of the outer yokes 219 on opposite sides of the inner yokes 218.

In the above-described configuration, when the focusing coil 216 is energized, the movable unit 215 is moved by an electromagnetic force in the Y direction, as shown in FIG. 17. Thus, focusing control can be performed. When the tracking coils 217 are energized, the movable unit 215 is moved by an electromagnetic force in the X direction, as shown in FIG. 16. Thus, tracking control can be performed.

However, both of the above-mentioned conventional apparatus have problems, which will be described hereinafter. In the apparatus shown in FIGS. 13 through 16, the damper member 112 serves to set a neutral position for the supporting sleeve 104. The damper member 112 is rigidly secured at a position opposite to the objective lens 105 with respect to the shaft 102, i.e., at a biased position. Thus, when a displacement is given in the focusing direction, a moment of rotation about an orthogonal axis of the supporting sleeve 104 is produced. As a result, a reaction force proportional to this moment is produced between the shaft 102 and the sleeve bearing 103. The sliding friction in the sleeve bearing 103 is substantially proportional to the vertical drag. Thus, the greater the displacement in the focusing direction, the larger the frictional force which is produced. Therefore, the relationship between displacement and forces exhibits a hysteresis loop, as shown in FIG. 18.

The apparatus shown in FIGS. 13 through 15 exhibits a large amount of hysteresis. This hysteresis causes problems in the accurate control of focusing and tracking. To reduce such problems, the inner surface of the sleeve bearing 103 and the surface of the shaft 102 may be finished with higher precision. However, such precision machining increases man-hours and production cost.

In the apparatus shown in FIGS. 16 and 17, when the objective lens 214 is moved in the tracking direction X, the point of application of force generated by the tracking coils 217 coincides with the center of gravity of the movable unit 215. As a result, the movable unit 215 is moved with the rods 213 in parallel. However, when the movable unit 215 is shifted from the neutral position in the focusing direction, the point of application of force generated by the tracking coils 217 deviates from the center of gravity of the movable unit 215. Thus, a moment force about the Z axis, as shown in FIG. 16, is produced. Consequently, the objective lens 215 becomes tilted, resulting in an increase of jitter.

If the movable unit was supported by a combination of parallel springs or a combination of parallel springs and bearings in place of the four metal rods 213, the force constraining the rotational displacement about the axis Z would become stronger. However, when the movable unit was shifted from a neutral position in the focusing direction, the movable unit still would be rotated about the axis Z. Thus, only at lower frequencies would the amount of tilting of the objective lens be reduced. However, at frequencies of about 1 kHz, tilting oscillation would occur, resulting in unstable control.

As described above, in the conventional objective lens driving apparatus, when displacement is made in the focusing direction, a rotational moment is inevitably produced. Thus, a large amount of hysteresis occurs. Also where the movable unit is shifted in a focusing or tracking direction, the balance of forces is destroyed, causing the objective lens to be tilted.

SUMMARY OF THE INVENTION

Accordingly, one object of the present invention is to provide an objective lens driving apparatus capable of substantially preventing hysteresis phenomena in the relationship between displacements and forces in the focusing direction of the objective lens.

Another object of the present invention is to provide an objective lens driving apparatus capable of maintaining the balance of force when the objective lens is shifted in the focusing or tracking direction. Thus, the objective lens can be readily prevented from tilting.

Still another object of the present invention is to provide an objective lens driving apparatus with a simplified configuration that can easily and accurately control the position of the objective lens. Thus, stable control characteristics of the apparatus can be achieved.

Briefly, in accordance with one aspect of the present invention, there is provided an objective lens driving apparatus having two pairs of supporting rods, each pair including two supporting rods disposed in parallel with each other. One pair of rods lies on a plane which intersects a plane through the other pair, and the apparatus has a movable unit to be rotated about the point of intersection of the supporting-rod planes when a tracking movement is performed.

Specifically, an objective lens driving apparatus according to the present invention includes a base, an objective lens, a movable unit for supporting the objective lens, and means for moving the movable unit with respect to the base in the direction of the optical axis of the objective lens or in a direction perpendicularly intersecting the optical axis of the objective lens. The apparatus further includes a first supporting-rod pair for supporting the movable unit with respect to the base. The first supporting-rod pair includes two supporting rods disposed in parallel with each other on a first plane parallel with the optical axis of the objective lens. The apparatus still further includes a second supporting-rod pair for supporting the movable unit with respect to the base. The second supporting-rod pair includes two supporting rods disposed in parallel with each other on a second plane different from the first plane of the first supporting-rod pair, and in parallel with the optical axis of the objective lens. The first and second supporting-rod pairs are disposed such that the first and second planes intersect within the periphery of the movable unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plan view, FIG. 2 is a cross-sectional view taken along line C—C of FIG. 1, and FIG. 3 is a perspective diagram;

FIG. 5 is a plan view, FIG. 6 is a perspective diagram, FIG. 7 is a cross-sectional view of FIG. 5, and FIG. 8 is a perspective diagram of FIG. 5;

FIG. 13 is a perspective diagram, FIG. 14 is a cross-sectional view taken along line A—A of FIG. 13, and FIG. 15 is a cross-sectional view taken along line B—B of FIG. 13, respectively;

FIG. 16 is a perspective diagram, and FIG. 17 is an exploded perspective diagram.

DESCRIPTION OF THE PREFERRED EMBODIMENTS

Figure 1:
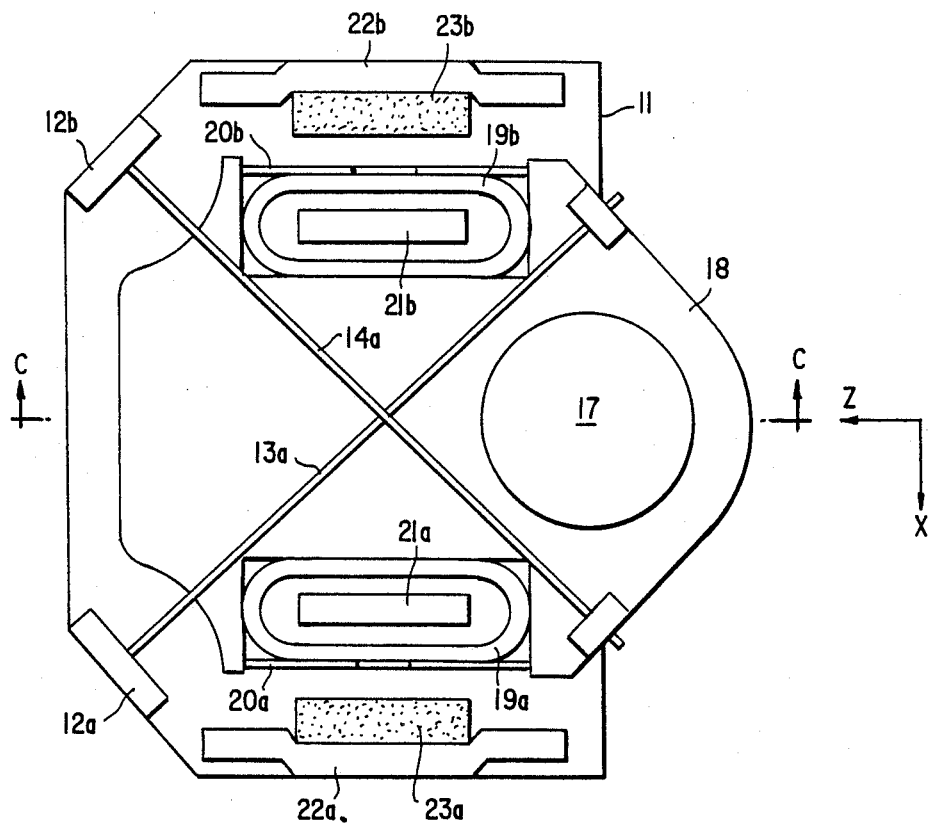
FIGS. 1 through 3 are diagrams illustrating schematic configurations of an objective lens driving apparatus according to one embodiment of the present invention.

Referring now to the drawings, wherein like reference numerals designate identical or corresponding parts throughout the several views, and more particularly to FIGS. 1 through 3 thereof, one embodiment of the present invention will be described.

Figure 2:
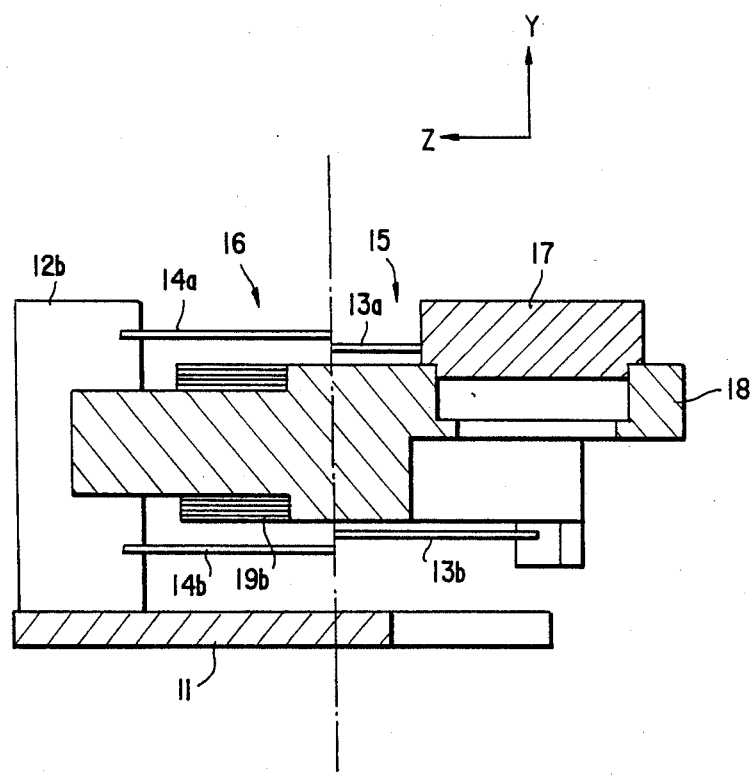
Figure 3:
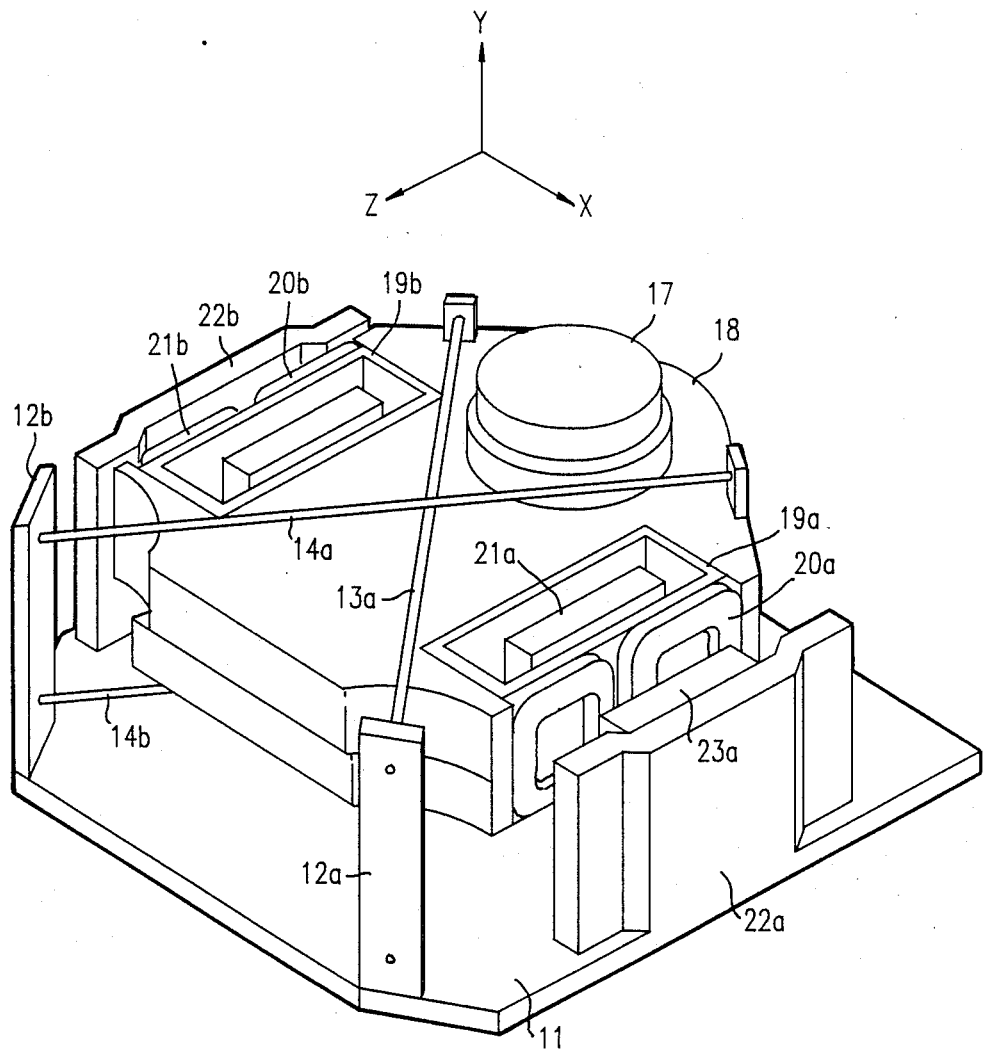

In FIGS. 1 through 3, reference numeral 11 designates a base made of a magnetic material. Supporting-rod fixing plates 12a and 12b are projected upwardly from the base 11 at two corners thereof. One end of each of supporting rods 13a and 13b is rigidly fixed to the supporting-rod fixing plate 12a. The rods 13a and 13b are parallel to each other and lie on a plane perpendicularly intersecting the base 11. Similarly, one end of each of supporting rods 14a and 14b is rigidly fixed to the supporting-rod fixing plate 12b. The rods 14a and 14b are parallel to each other and lie on a plane perpendicularly intersecting the base 11. The supporting rods 13a and 13b constitute a first supporting-rod pair 15, and the supporting rods 14a and 14b constitute a second supporting-rod pair 16. A first plane formed by the first supporting-rod pair 15 and a second plane formed by the second supporting-rod pair 16 are disposed so as to intersect with each other substantially at the center of the base 11.

The other ends of the first supporting-rod pair 15 and the second supporting-rod pair 16 are rigidly fixed to a movable unit 18 that supports an objective lens 17. The center of gravity of movable unit 18 and the line of intersection of the planes formed by the first and second supporting-rod pairs 15 and 16 are disposed so as to intersect with each other. Further, the objective lens 17 is disposed at a position separated from the center of gravity of the movable unit 18 by a specified distance. Focusing coils 19a and 19b and tracking coils 20a and 20b are rigidly fixed on the movable unit 18. These coils are symmetrically disposed on opposite sides of the center of gravity of the movable unit 18.

Inner yokes 21a and 21b project from the base 11 so as to fit into the space formed by focusing coils 19a and 19b with a certain specified clearance. Outer yokes 22a and 22b project from the base 11 at positions opposing the inner yokes 21a and 21b. Permanent magnets 23a and 23b are rigidly fixed to the inner faces of the outer yokes 22a and 22b. Thus, the focusing coils 19a and 19b and the tracking coils 20a and 20b are sandwiched between the inner yokes 21a and 21b and the permanent magnets 23a and 23b.

In this configuration, when the focusing coils 19a and 19b are energized, the movable unit 18 is moved by an electromagnetic force in a direction Y, as shown in FIG. 2. Thus, focusing control can be performed. When the tracking coils 20a and 20b are energized, the movable unit 18 is rotationally moved by an electromagnetic force in a rotational direction about the Y axis, as shown in FIG. 2. Thus, tracking control can be performed. In this case, the movable unit 18 is supported with respect to the base 11 only by the first and second supporting-rod pairs 15 and 16. As a result, the following advantages can be obtained.

Figure 4:
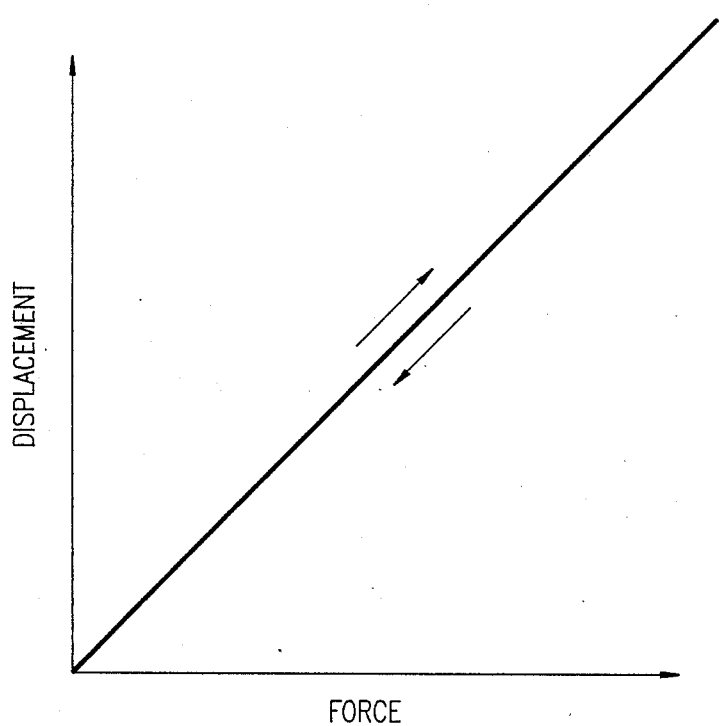
FIG. 4 is a graph illustrating the driving characteristics in the focusing direction of the apparatus shown in FIGS. 1 through 3.
Figure 5:
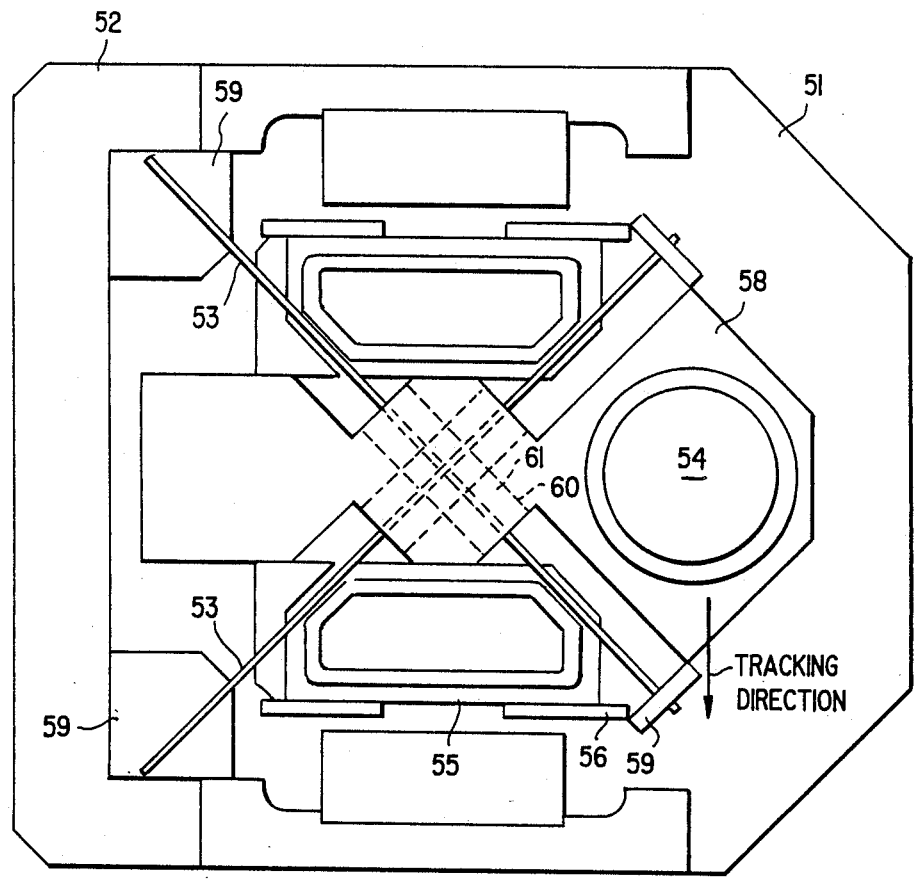
FIGS. 5 through 8 are diagrams illustrating schematic configurations of an objective lens driving apparatus according to another embodiment of the present invention.
Figure 6:
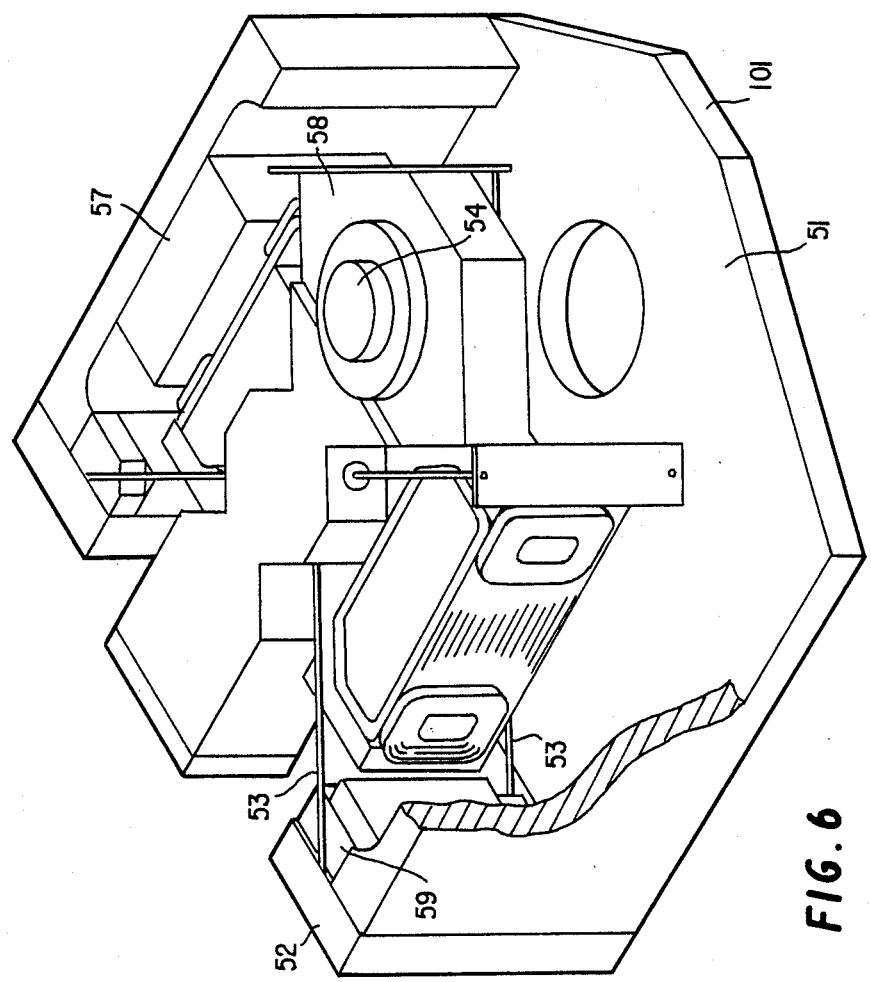
Figure 7:
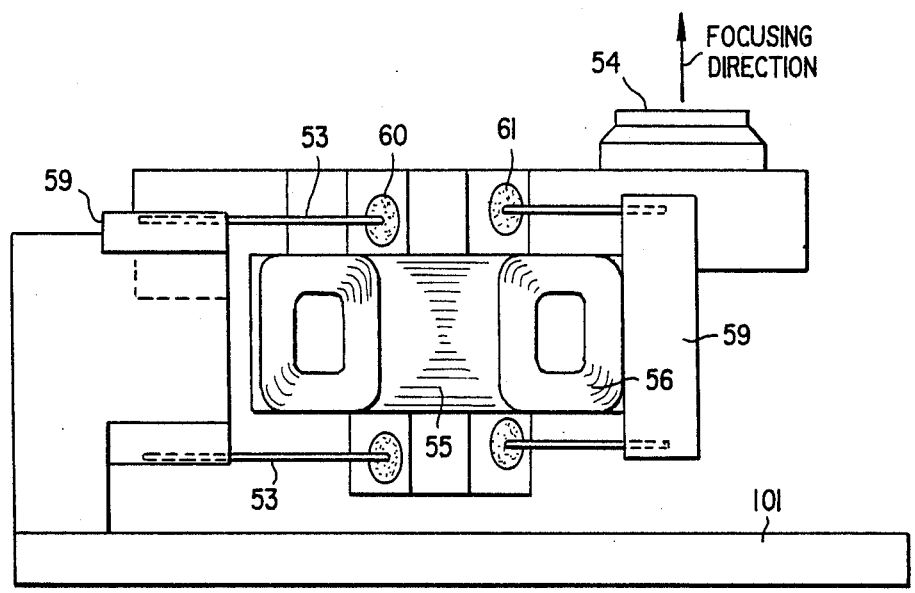
Figure 8:
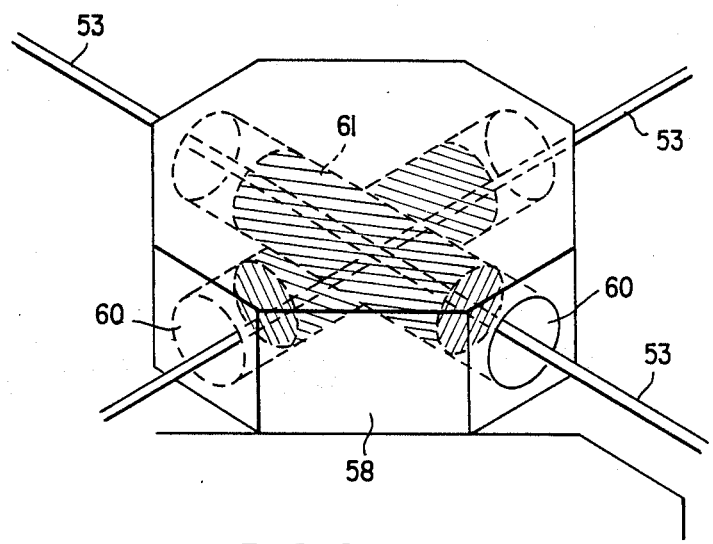

With this configuration, both a rotational movement and sliding movement with respect to a single axis can be obtained without any substantial bearing force. Thus, the movable unit 18 can be moved with very little friction. Therefore, the relationship between semi-static displacements and forces in the focusing direction substantially approaches linearity, as shown in FIG. 4. This arrangement avoids the hysteresis phenomenon shown in FIG. 9. Because there is substantially no hysteresis in semi-static displacements, servo control quickly and accurately accomplished.

The tracking movement of objective lens 17 is carried out by the rotational movement of movable unit 18 caused by forces generated by the tracking coils 20a and 20b. These forces do not change even when the relative positions between the magnetic circuit and the tracking coils 20a and 20b are changed by displacement in the focusing direction or the tracking direction. Further, the supporting-rod pairs 15 and 16 are disposed so that the first and second planes formed by the respective pairs intersect with each other at substantially the center of gravity of the movable unit 18. Thus, the supporting-rod pairs 15 and 16 cooperatively allow substantially friction-free movement of the movable unit 18 in the focusing direction and also in the tracking direction with respect to the center of gravity of the movable unit 18. Therefore, even when the objective lens 17 is moved in the tracking direction in a state wherein the movable unit 18 is shifted in the focusing direction from the neutral position, there is substantially no force acting to rotate the movable unit 18 about the Z axis. Thus, this configuration results in a significantly improved, more stable control operation.

Figure 16:
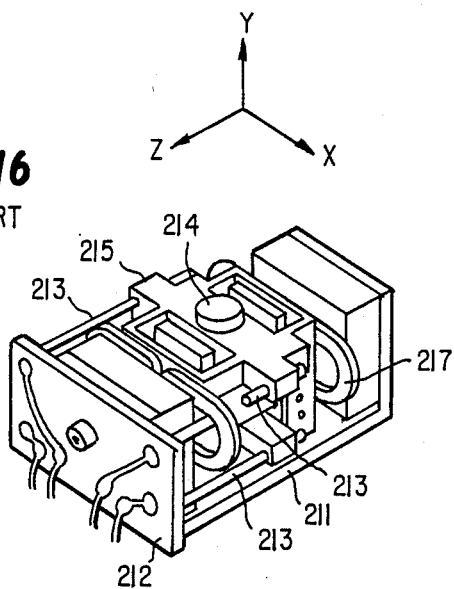
FIGS. 16 and 17 are diagrams illustrating schematic configurations of a second example of a conventional apparatus.
Figure 17:
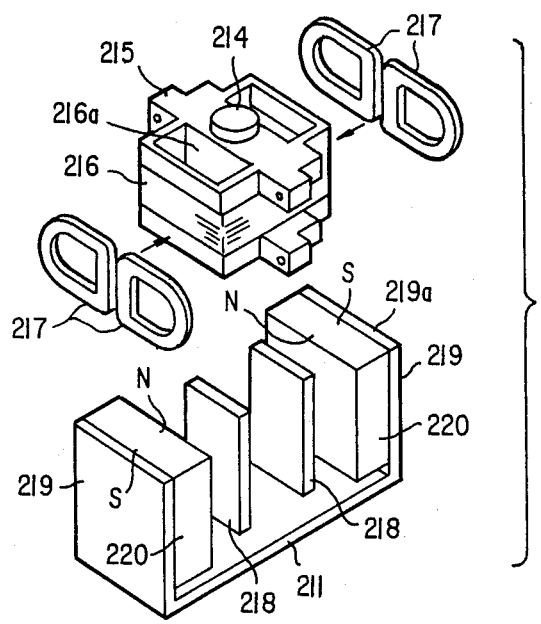
Figure 18:
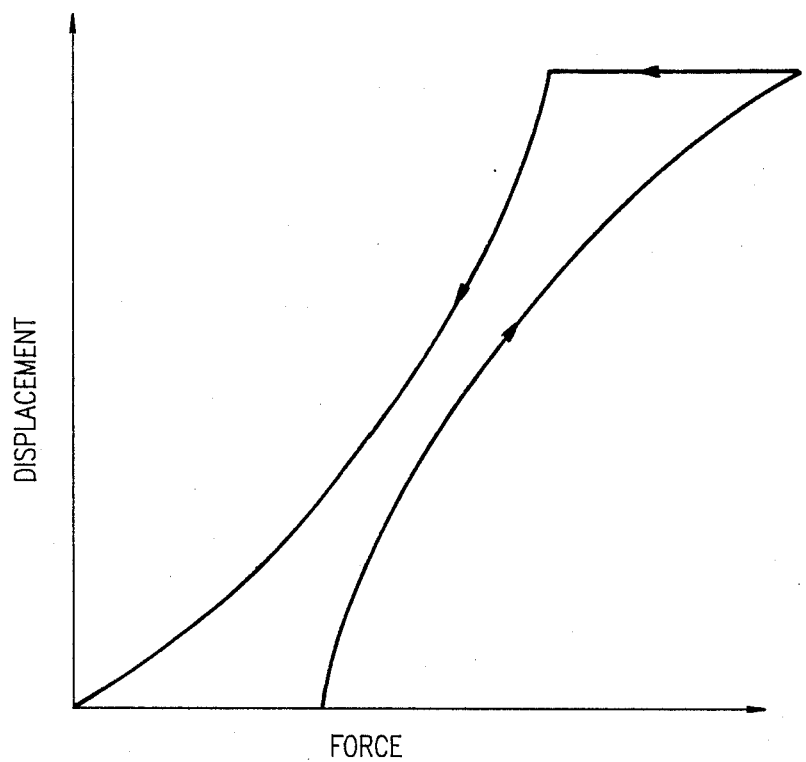
FIG. 18 is a graph illustrating the driving characteristics in the focusing direction of the first example shown in FIGS. 13 through 15.

Moreover, since the supporting-rod pairs 15 and 16 are disposed to intersect with each other, the stability of the respective supporting rods becomes extremely high, except in the direction Y and the rotational direction about the center of gravity of the movable unit 18. Thus, more stable position control of the movable unit 18 can be achieved. And, the objective lens 17 is hard to be rolled when the base 11 is roughly transferred. Further, the number of parts of this configuration is substantially the same as that of the conventional apparatus shown in FIGS. 16 and 17. Thus, this configuration is not more complicated than the conventional apparatus.

The present invention is not limited to the above-mentioned embodiment. For example, the line of intersection of the planes of the first and second supporting-rod pairs preferably coincides with a line parallel to the line of intersection of the two planes and passing through the center of gravity of the movable unit, however, it is not necessary that they completely coincide. Moreover, the material and dimensions such as length and diameter of the supporting rods may be determined depending upon the weight of movable unit and other conditions. For example, as a material for the supporting rods, besides general metallic rods, such materials as carbon fiber composite materials, elastic alloy materials, stainless steel alloy and copper alloy may also be utilized. If, the electric conductive elastic material is used as the material of the supporting rods, the elastic material is simultaneously utilized as leads.

In addition, the arrangement of the focusing coils and tracking coils is not limited to that shown in FIG. 1. Various modifications may be considered depending upon specifications required. For example, in the above-mentioned embodiment, the focusing and tracking coils are fixed on the movable unit, and the permanent magnets are fixed on the base (a moving-coil type). Instead, the focusing and tracking coils may be fixed on the base, and the permanent magnets may be fixed on the movable side (a moving-magnet type). In the case of a moving-magnet type, the movable unit side has no wiring for coils. Thus, the apparatus has a simpler construction.

As described above, according to one embodiment of the present invention, there is provided an objective lens driving apparatus, wherein a movable unit is supported by two supporting-rod pairs lying in two perpendicular planes that intersect with each other at substantially the center of gravity of the movable unit. Thus, the apparatus had advantages in that the relationship between the semi-static displacements and forces in the focusing direction exhibits no hysteresis phenomenon, because the movable unit is not subjected to undesired moment forces causing friction.

Next, another embodiment of the present invention will be described with reference to the drawings. In this embodiment, resonance vibrations, which are produced when focusing/tracking operations are performed for an objective lens, are suppressed. As a result, the tracking characteristics of the objective lens with respect to an information recording medium are significantly improved.

In FIGS. 5 through 8, a supporting-rod fixing structure 52 projects from a base 51 on one side thereof. Two supporting-rod fixing portions 59 are disposed at opposite end of the supporting-rod fixing structure 52. One end of each pair of supporting rods 53 is rigidly fixed to one of the supporting-rod fixing portions 59. The other ends of the supporting rods 53 are rigidly fixed to a movable unit 58. The supporting rods 53 include two pairs of supporting rods disposed in parallel and extending from the supporting-rod fixing portions 59. Each pair of the supporting rods 53 is respectively disposed within a plane parallel to the optical axis of an objective lens 54. However, the intersecting line of the respective planes is disposed to coincide with the parallel line passing through the center of gravity of the movable unit 58.

The movable unit 58 is provided with the objective lens 54, focusing coils 55 and tracking coils 56. Four supporting rods 53 pass through piercing holes 60 in the movable unit 58. Preferably, the piercing holes are lined with a viscoelastic material 61, such as gel silicone.

The operations of focusing and tracking of the objective lens 54 are substantially the same as those described with reference to FIGS. 1 through 4, so that the descriptions thereof are omitted.

As described above, the viscoelastic material 61 is directly attached to the movable unit 58 that supports the objective lens 54. As a result of the low viscous drag of this material 61, displacement speeds within the viscoelastic material 61 can be significantly increased. The vibration damping effect on the objective lens 54 can be adjusted by proper selection of the packing amount or attaching positions of the viscoelastic material 61. This adjustment is also made depending upon the relative displacement between the movable unit 58 and the supporting rods 53.

Moreover, the axis of action of vibration damping force, which is derived from the viscoelastic material 61 and is applied to the movable unit 58, can also be adjusted so as to coincide with the parallel line passing through the center of gravity of the movable unit 58. This adjustment can be achieved by proper selection of the packing amount or attaching positions of the viscoelastic material 61. As a result, the objective lens 54 can be prevented from tilting. Also, abnormal movements of the movable unit 58, such as resonance vibrations, can be readily prevented.

A viscoelastic material packed into the piercing holes does not scatter outside by utilizing the surface tension thereof.

A movable unit for the objective lens must be both stiff and light weight, and the above-described apparatus can meet these requirements. Further, a viscoelastic material which produces a vibration damping effect can be readily attached without using any additional significant space.

Figure 9:
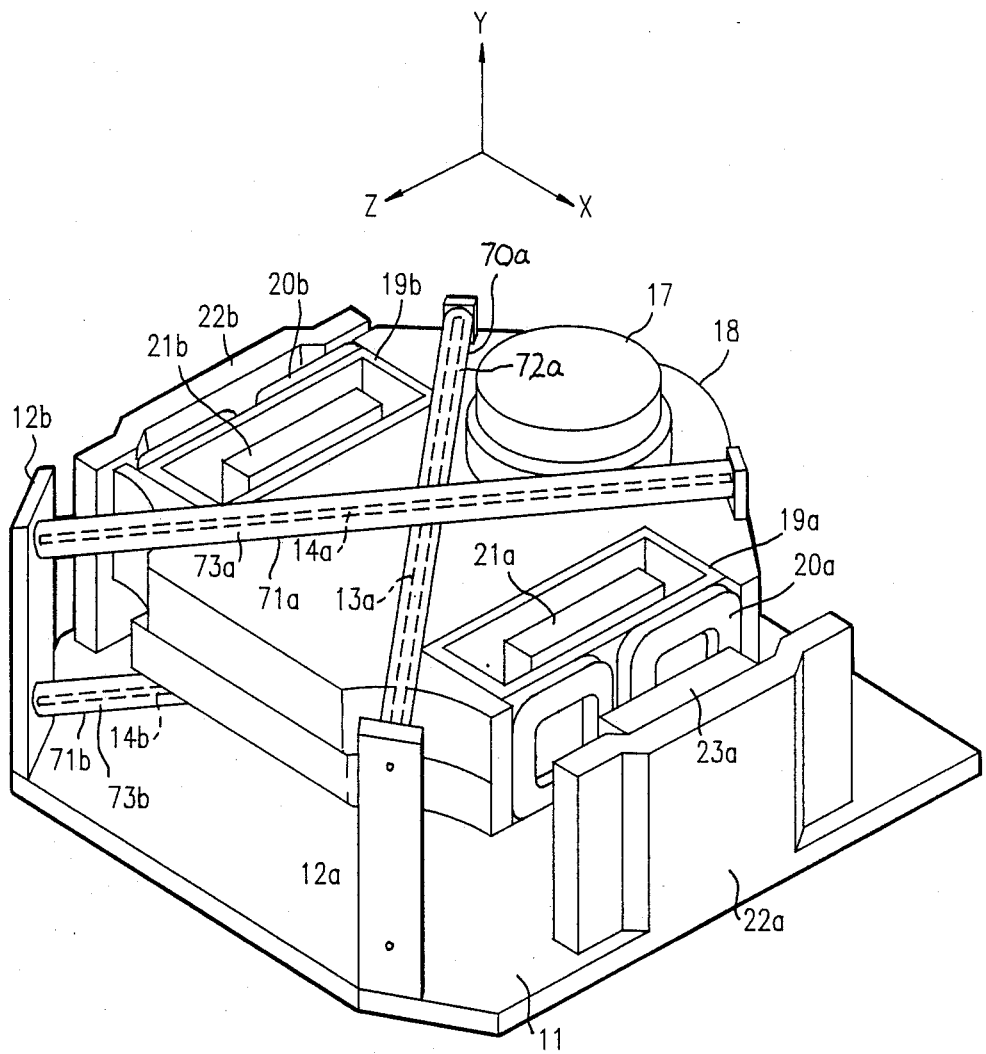
FIG. 9 is a perspective diagram illustrating a schematic configuration of an objective lens driving apparatus according to still another embodiment of the present invention.

Next, still another embodiment of the present invention will be described with reference to FIG. 9. FIG. 9 is a perspective view illustrating an objective lens driving apparatus, wherein a viscoelastic material is attached in another manner to the apparatus shown in FIG. 3 to enhance the vibration damping effect.

In FIG. 9, the supporting rods 13 and 14 are surrounded with cylindrical structures 70 and 71, which are packed with viscoelastic materials 72 and 73. This configuration allows the entire length of the supporting rods 13 and 14 to be surrounded with the viscoelastic materials 72 and 73. Thus, more pronounced effects on vibration damping can be obtained.

Figure 10:
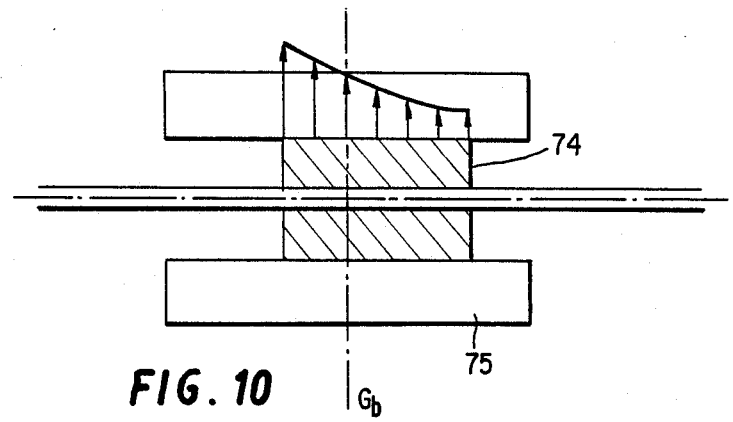
FIGS. 10 through 12 are cross-sectional views illustrating modifications of the essential portions of the embodiment of FIG. 9.
Figure 11:
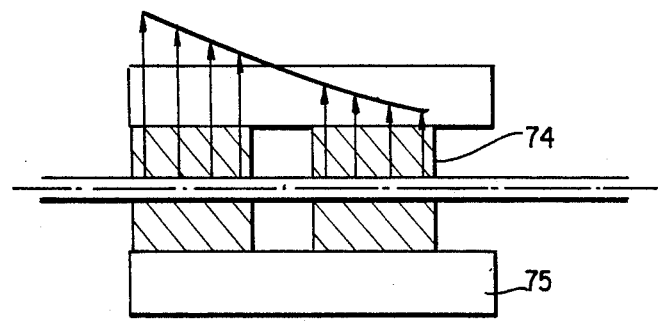
Figure 12:
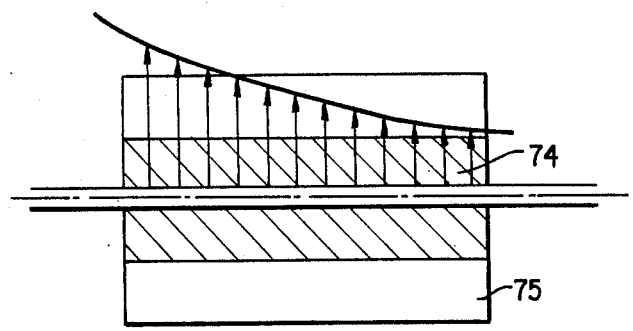
Figure 13:
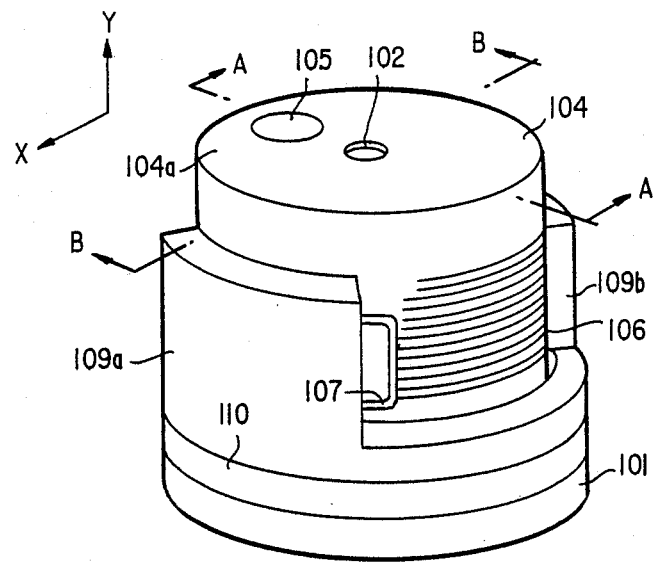
FIGS. 13 through 15 are diagrams illustrating schematic configurations of a first example of a conventional apparatus.
Figure 14:
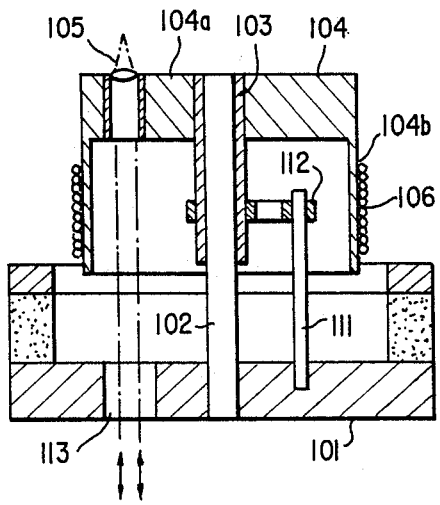
Figure 15:
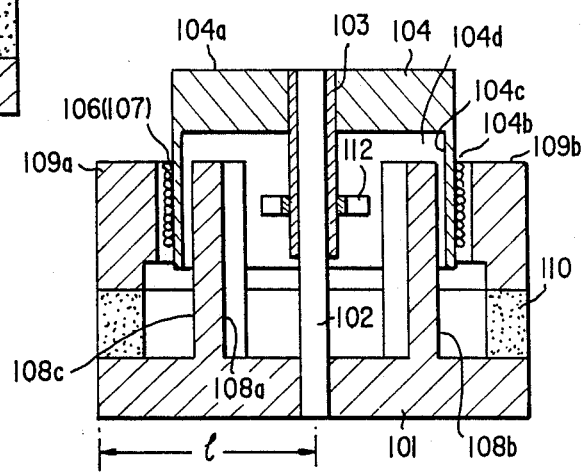

FIGS. 10 through 12 are schematic diagrams illustrating different methods of packing a viscoelastic material 74 into a cylindrical structure 75.

In FIG. 10, the viscoelastic material 74 only is packed symmetrically on opposite sides of the intersecting point of the supporting rod planes. As a result, the axis of action of the vibration damping force coincides substantially with the parallel line passing through the center of gravity Gb of the movable unit.

In FIG. 11, the viscoelastic material 74 is packed only into positions having the larger relative displacements.

In FIG. 12, the vibration damping effect is enhanced by increasing the packing amount of the viscoelastic material 74.

As described above, a viscoelastic material is packed between the supporting rods and the movable unit, and the positions and amounts of the viscoelastic material are adjusted. This can significantly suppress resonance vibrations of the objective lens. Also, this can effectively prevent the optical axis of the objective lens from tilting. Therefore, an objective lens driving apparatus, which is controlled by stable position control with higher accuracy, can be achieved.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An objective lens driving apparatus comprising:
   an objective lens;
   a movable unit having a center of gravity for supporting said objective lens;
   means for moving said movable unit with respect to a stationary unit in a direction of an optical axis of said objective lens;

a pair of means for rotating said movable unit being provided on symmetrical positions with respect to the center of gravity;

a first supporting-rod pair for supporting said movable unit with respect to said stationary unit, said first supporting-rod pair comprising two supporting rods disposed in parallel with each other within a plane being in parallel with the optical axis of said objective lens;

a second supporting-rod pair for supporting said movable unit with respect to said stationary unit, said second supporting-rod pair comprising two supporting rods disposed in parallel with each other within a plane being different from the plane of said first supporting-rod pair, and being in parallel with the optical axis of said objective lens; and said first and second supporting-rod pairs being disposed such that an intersecting line of the planes including respectively said first and second supporting-rod pairs passes through said movable unit.

2. An objective lens driving apparatus of claim 1, wherein the intersecting line of the two planes respectively including said first and second supporting-rod pairs is caused to substantially coincide with a line parallel thereto and passing through the center of gravity.

3. An objective lens driving apparatus of claim 1, wherein said first and second supporting-rod pairs are disposed in parallel with a plane perpendicularly intersecting the optical axis of said objective lens.

4. An objective lens driving apparatus of claim 1, wherein two planes respectively including said first and second supporting-rod pairs intersect each other substantially perpendicularly.

5. An objective lens driving apparatus of claim 1, wherein said movable unit is disposed between the respective parallel supporting rods of said first and second supporting-rod pairs.

6. An objective lens driving apparatus of claim 5, wherein at least partial portions of surroundings of the supporting rods of said first and second supporting-rod pairs are surrounded with viscoelastic materials.

7. An objective lens driving apparatus of claim 6, wherein the viscoelastic materials are of gel silicone.

8. An objective lens driving apparatus of claim 1, wherein said supporting rods are formed by an elastic material.

9. An objective lens driving apparatus of claim 1, wherein the supporting rods of said first and second supporting-rod pairs are disposed so as to pass through said movable unit.

10. An objective lens driving apparatus of claim 9, wherein viscoelastic materials are packed into piercing holes of said movable unit.

11. An objective lens driving apparatus of claim 10, wherein the viscoelastic materials are of gel silicone.

12. An objective lens driving apparatus of claim 9, wherein the supporting rods of said first and second supporting-rod pairs are disposed to intersect with each other at piercing portions of said movable unit.

13. An objective lens driving apparatus of claim 1, wherein at least partial portions of surroundings of the supporting rods of said first and second supporting-rod pairs are surrounded with viscoelastic materials.

14. An objective lens driving apparatus of claim 13, wherein the viscoelastic materials are of gel silicone.

15. An objective lens driving apparatus of claim 1, wherein said movable unit has a rigid block shape.

* * * * *